United States Patent
Blackburn et al.

(10) Patent No.: US 11,408,815 B2
(45) Date of Patent: Aug. 9, 2022

(54) METHOD AND A DEVICE FOR QUANTIFYING LIVING ORGANISMS AND USE OF A DEVICE

(71) Applicant: MICROWISE APS, Ebeltoft (DK)

(72) Inventors: Nicholas David Blackburn, Knebel (DK); Per-Ove Poulsen, Rødvig Stevns (DK); Kirsten Engell-Sørensen, Højbjerg (DK); Pia Bodil Haecky, Knebel (DK)

(73) Assignee: Microwise APS, Kvistgård (DK)

( * ) Notice: Subject to any disclaimer, the term of this patent is extended or adjusted under 35 U.S.C. 154(b) by 505 days.

(21) Appl. No.: 16/607,324

(22) PCT Filed: Apr. 28, 2017

(86) PCT No.: PCT/DK2017/050131
§ 371 (c)(1),
(2) Date: Oct. 22, 2019

(87) PCT Pub. No.: WO2018/196932
PCT Pub. Date: Nov. 1, 2018

(65) Prior Publication Data
US 2020/0378883 A1    Dec. 3, 2020

(51) Int. Cl.
*G01N 15/14*    (2006.01)

(52) U.S. Cl.
CPC ..... *G01N 15/1463* (2013.01); *G01N 15/1434* (2013.01); *G01N 2015/1486* (2013.01);
(Continued)

(58) Field of Classification Search
CPC ........... G01N 15/1463; G01N 15/1434; G01N 2015/1486; G01N 2015/1488;
(Continued)

(56) References Cited

U.S. PATENT DOCUMENTS

| 5,093,866 A | 3/1992 | Douglas-Hamilton et al. |
| 5,149,972 A * | 9/1992 | Fay ..................... G02B 21/0096 |
| | | 348/E5.085 |

(Continued)

FOREIGN PATENT DOCUMENTS

| JP | 2013094064 A | 5/2013 |
| KR | 20170038427 A | 4/2017 |
| WO | WO-2015056862 A1 | 4/2015 |

OTHER PUBLICATIONS

Truong, D. et al., "Breast Cancer Cell Invasion into a Three Dimensional Tumor-Stroma Microenvironment", Scientific Reports, Sep. 28, 2016, vol. 6, Article No. 34094, pp. 1-18, Supplementary Information, doi: 10.1038/srep34094.

(Continued)

*Primary Examiner* — Roy M Punnoose
(74) *Attorney, Agent, or Firm* — Blank Rome LLP

(57) ABSTRACT

Disclosed is a method for quantifying living organisms (1, 4) in a liquid sample (2), the method comprising the steps of •guiding the liquid sample (2) into a chamber (3), •analysing pictures of the sample (2) inside the chamber (3) to detect the number of organisms (4) moving by themselves in the sample, •illuminating the sample (2) with light in at least a part of the violet-blue spectrum while detecting the number of organisms (1) that are fluorescent in the sample inside the chamber (3), and •analysing pictures of the sample (2) inside the chamber (3) while illuminating the sample (2) with light in at least a part of the violet-blue spectrum to detect the number of organisms (1, 4) that are both moving by themselves and fluorescent. A device (15) for quantifying living organisms (1, 4) and use of a device (15) is also disclosed.

20 Claims, 4 Drawing Sheets

Figure 1:
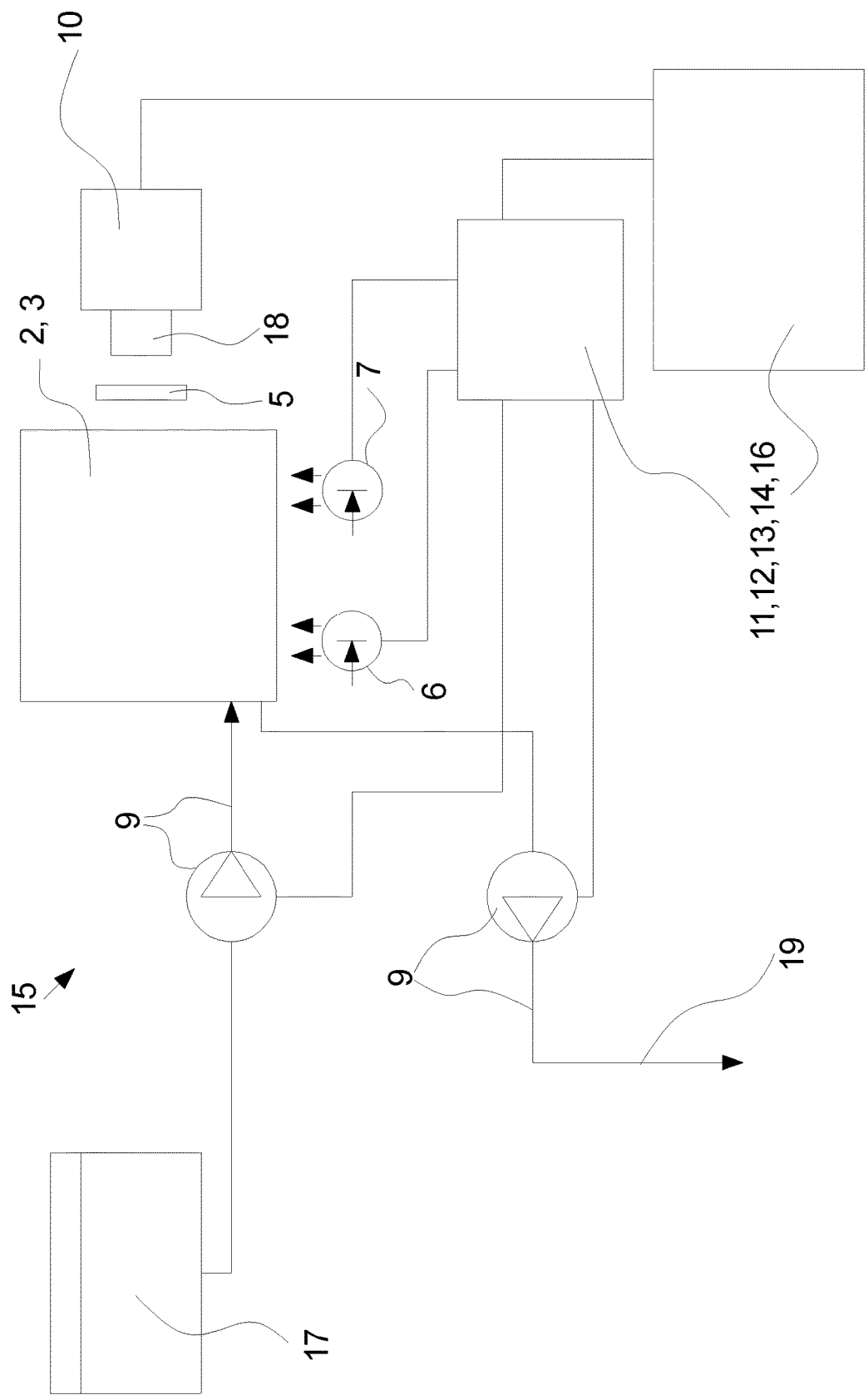

(52) U.S. Cl.
CPC .............. *G01N 2015/1488* (2013.01); *G01N 2015/1493* (2013.01)

(58) Field of Classification Search
CPC ....... G01N 2015/1493; G01N 15/1429; G01N 2015/1006; G01N 21/6456; G01N 21/6486; G01N 21/6408; C02F 2209/36; C02F 2103/008
See application file for complete search history.

(56) References Cited

U.S. PATENT DOCUMENTS

2010/0232675 A1\* 9/2010 Ortyn ................ A61B 1/00188
382/134
2016/0252715 A1\* 9/2016 Nakano ............. G02B 27/0025
359/385

OTHER PUBLICATIONS

Maine, E. A. et al., "The cancer-testis antigens SPANX-A/C/D and CTAG2 promote breast cancer invasion", Oncotarget, Feb. 15, 2016, vol. 7, No. 12, pp. 14708-14726, doi:10.18632/oncotarget.7408.
International Search Report & Written Opinion for PCT/DK2017/050131, dated Sep. 11, 2018, 9 pages.

\* cited by examiner

METHOD AND A DEVICE FOR QUANTIFYING LIVING ORGANISMS AND USE OF A DEVICE

RELATED APPLICATIONS

This application is a national phase of PCT/DK2017/050131, filed on Apr. 28, 2017. The entire content of this application is hereby incorporated by reference.

FIELD OF THE INVENTION

The invention relates to a method for quantifying living organisms in a liquid sample comprising the steps of guiding the liquid sample into a chamber and analysing pictures of the sample inside the chamber. The invention also relates to a device for quantifying living organisms in a liquid sample and use of a device.

BACKGROUND OF THE INVENTION

Often there is a need to detect and quantify the number of living organisms in a liquid sample e.g. in relation to research, environmental surveillance, or other. E.g. in relation to ballast water in ships the guidelines for approval of ballast water management systems put forward by the Marine Environmental Protection Committee specify that ballast water after treatment shall contain at most 10 cells per ml in the size fraction 10-50 µm and at most 10 cells per m3 in the size fraction >50 µm. Thus, in such circumstances analysis of the discharge ballast water is required.

An obvious method for quantifying the number of living organisms in a liquid sample is to place the sample under a microscope and then manually detect if cells are alive, manually detect their size and manually quantify the relevant cells. However, such a process is time consuming and expensive.

Thus, from U.S. Pat. No. 5,093,866 A it is known to produce information concerning the motility and other characteristics of cells, bacteria and particles in a fluid medium by imaging light transmitted through the medium on an image detection apparatus and by inducing fluorescence in cells and also imaging this light on the image detection apparatus. However, this method is expensive and inaccurate.

It is therefore an object of the present invention to provide for a cost-effective technique for quantifying living organisms in a liquid sample.

THE INVENTION

The invention provides for a method for quantifying living organisms in a liquid sample, the method comprising the steps of
  guiding the liquid sample into a chamber,
  analysing pictures of the sample inside the chamber to detect the number of organisms moving by themselves in the sample,
  illuminating the sample with light in at least a part of the violet-blue spectrum while detecting the number of organisms that are fluorescent in the sample inside the chamber, and
  analysing pictures of the sample inside the chamber while illuminating the sample with light in at least a part of the violet-blue spectrum to detect the number of organisms that are both moving by themselves and fluorescent.

Any given water sample of e.g. ballast water will hold a number of different heterotrophic and autotrophic organisms that are dead or alive, that are capable of moving by themselves or not and that are fluorescent when exposed to light in the violet-blue spectrum or not.

Chlorophyll within organisms can be detected by the organism's fluorescence after illuminating the organism with light in the violet-blue spectrum and the presence of chlorophyll is an indication of a live autotrophic cell, because chlorophyll disappears quite rapidly after cell damage. Likewise, it is recognized that organisms that are capable of moving by themselves are also alive.

It is therefore advantageous to quantifying living organisms in a liquid sample by a specialised process detecting motile organisms and another specialised process detecting fluorescent organisms. However, certain organisms are both motile and fluorescent and it is therefore advantageous to increase the accuracy of the method by also detecting these organisms so that a better and more efficient quantification of living organisms can be achieved.

It should be pointed out that even though the method steps are listed in a given order, the scope of the claim is not limited to the different method steps being performed in that order. E.g. the detection the number of organisms that are fluorescent could just as well take place before the organisms moving by themselves are detected.

In this context, the term "organism" should be understood as any kind of heterotrophic organism such as zooplankton, protozoa, bacteria, and other and any kind of autotrophic and mixotrophic organisms such as phytoplankton, cyanobacteria and other or any other kind of single-celled or multicellular microorganism or microbe.

In this context the term "chamber" should be understood as any kind of container, cuvette, space or other suitable for holding a liquid sample while it is being analysed.

Since the sample in most cases is analysed by means of equipment located outside the chamber it is advantageous if one or more sides of the chamber are transparent.

Also, in this context the term "organisms moving by themselves" should be understood as any kind of motile organism, self-propelled organism, self-moving organism or any other kind of organism having the ability to move spontaneously and actively, while consuming energy in the process. The term should not be confused with mobility, which describes the ability of an object to be moved.

Furthermore, in this context the term "fluorescent" should be understood as organisms that are capable of the emission of light when having absorbed light or other electromagnetic radiation. I.e. when these organisms are exposed to light at one wavelength they will more or less instantaneously emit light typically at another wavelength. Fluorescence is a form of luminescence and the fluorescent organisms cease to emit light immediately when the radiation source stops, unlike phosphorescence, where light emission continues for some time after radiation stops. Such organisms are also referred to as auto-fluorescent organisms.

In an aspect of the invention, the number of fluorescent organisms are detected by analysing one or more pictures of the sample inside the chamber.

As previously explained live fluorescent organisms will light up when exposed to light in at least a part of the violet-blue spectrum. Thus, taking a picture during this exposure will enable that the live fluorescent organisms can easily by identified and counted.

In an aspect of the invention, the picture is recorded through a light filter arranged to block or attenuate light in at least the part of the violet-blue spectrum.

The light in the violet-blue spectrum will also be reflected, scattered, refracted or other by other organisms, the water itself will refract the light and the light will be reflected by other objects and other in the sample. Thus, to reduce noise and enable a more accurate quantification it is advantageous to record the picture through a light filter arranged to block or attenuate light in violet-blue spectrum so that the light from the fluorescent organisms can be detected more precisely.

In an aspect of the invention, the light filter is arranged to block or attenuate light at a wavelength below 650 nm, preferably below 600 nm and most preferred below 550 nm.

If the light filter is arranged to block or attenuate light below a too high wavelength the light filter will block too much light and if the light filter is arranged to block or attenuate light below a too low wavelength the effect of the light filter will be reduced. Thus, the present wavelength levels are advantageous in relation to function.

In an aspect of the invention, the pictures used for detecting the number of organisms moving by themselves are recorded while illuminating the sample.

By illuminating the sample while recording the pictures used for detecting motile organisms, the organisms and their motion will be easier to detect.

In an aspect of the invention, the pictures used for detecting the number of organisms moving by themselves are recorded while illuminating the sample with a secondary light source different from a light source generating light in the at least a part of the violet-blue spectrum.

Illuminating the sample with a secondary light source while recording the pictures used for detecting motile organisms is advantageous in that it hereby is possible to provide lighting that are more suited for the given task.

In an aspect of the invention, the secondary light source is turned off while the pictures used for detecting the number of fluorescent organisms are recorded.

Turning the secondary light source off while detecting fluorescent organisms is advantageous in that the risk of the secondary light disturbing the detection of fluorescent organisms is hereby reduced.

In an aspect of the invention, the sample is illuminated by white light.

Illuminating the sample with full-spectrum white light e.g. also comprising ultraviolet and/or infrared light while detecting motile organisms is advantageous in that it enables better and more contrasted pictures.

In an aspect of the invention, the method further comprises the step of storing at least some of the pictures on a storage device.

Storing at least some of the pictures on a storage device such as on ROM, a flash drive, a hard drive or other is advantageous in that the quantification hereby can verified and traced.

In an aspect of the invention, the method further comprises the step of analysing the pictures used for detecting the number of organisms moving by themselves to detect the size of the organisms moving by themselves.

According to some regulations a given liquid volume must only contain a certain number of living organisms above a certain size, below a certain size or within a certain size range. It is therefore advantageous to also detect the size of the motile organisms.

In an aspect of the invention, the method further comprises the step of detecting the size of the fluorescent organisms in the sample.

According to some regulations a given liquid volume must only contain a certain number of living organisms above a certain size, below a certain size or within a certain size range. It is therefore advantageous to also detect the size of the fluorescent organisms.

In an aspect of the invention, the organisms that are fluorescent are autofluorescent organisms.

Organisms can be made fluorescent by means of e.g. fluorophore but the handling of the fluorophore and the effect that it will have on organisms is often problematic. Such as dye process takes time, it increases cost, and sometimes organisms will not absorb the fluorophore and these organisms will therefore not be detected. And added fluorophore can also often induce fluorescence in the liquid and thereby also reduce accuracy. It is therefore advantageous to only detect auto-fluorescent organisms.

In an aspect of the invention, the part of the violet-blue spectrum is light at a wavelength between 100 and 600 nm, preferably between 300 and 470 nm and most preferred between 400 and 440 nm.

If the wavelength range of the violet-blue light is too wide the risk of the light coinciding with the fluorescent wavelength is increased and if the wavelength range of the violet-blue light is too narrow the risk of not exciting the fluorescent effect in the organisms is increased. Thus, the present wavelength ranges present an advantageous relationship in relation to function.

In an aspect of the invention, the method further comprises the step of guiding the liquid sample out of the chamber when the number of organisms moving by themselves has been detected and when the number of organisms that are fluorescent has been detected.

Guiding the liquid sample out of the chamber after having detected motile and fluorescent organisms is advantageous in that the chamber hereby can be reused for another test.

In an aspect of the invention, the method further comprises the step of allowing the liquid sample to settle inside the chamber before the number of organisms moving by themselves is detected.

Motile organisms are detected by detecting their position in a sequence of pictures and if the sample is not allowed to settle after being led to the chamber—before detecting motile organisms—the accuracy is reduced.

In an aspect of the invention, the pictures are analysed to detect the number of organisms moving by themselves in the sample by means of motion tracking.

Tracking the position of specific organisms in subsequent images of the sample provides a simple and efficient method for detecting motile organisms. Motion tracking is also known as motion analysis, motion capture and other.

In an aspect of the invention, the organisms that are both moving by themselves and fluorescent are identified by detecting the number of organisms that are moving by themselves in the sample while detecting the number of organisms that are fluorescent.

Also performing motion tracking on the fluorescent organisms is a simple and fast way of detecting organisms that are both moving by themselves and fluorescent.

In an aspect of the invention, the living organisms in the liquid sample are quantified by adding the detected number of organisms that are moving by themselves to the detected number of organisms that are fluorescent to get an intermediate result, and then subtracting the detected number of organisms that are both moving by themselves and fluorescent from the intermediate result.

Deducting the organisms that are both motile and fluorescent from the sum of organisms detected during the motility test and the sum of organisms detected during the fluorescent test is advantageous in that repeaters hereby can be avoided and a more accurate number of living organisms can be achieved.

In an aspect of the invention, the method step of analysing pictures of the sample inside the chamber to detect the number of organisms moving by themselves in the sample and the method step of illuminating the sample with light in at least a part of the violet-blue spectrum while detecting the number of organisms that are fluorescent in the sample inside the chamber are performed as two separate consecutive actions.

Performing the process of detecting motile organisms separate from the process of detecting fluorescent organisms is advantageous in that it hereby is possible to preform each process under conditions (such as lighting conditions, camera frame speed and/or resolution, light filters or other) enabling that each process can be performed better and/or more efficiently.

In an aspect of the invention, the detection of the fluorescent organisms and the detection of the number of organisms that are both moving by themselves and fluorescent takes place in substantially the same process.

Detecting the fluorescent organisms while also detecting organisms that are both motile and fluorescent provides for a faster and more efficient method.

The invention further provides for a device for quantifying living organisms in a liquid sample. The device comprises a chamber for holding the sample and guiding means for guiding the sample into the chamber. The device further comprises a camera arranged to record pictures of the sample inside the chamber and analysing means arranged to analyse the pictures to count the number of organisms moving by themselves in the sample. The device also comprises a violet-blue light source arranged to illuminate the sample with light in at least a part of the violet-blue spectrum and detection means arranged count the number of organisms that are fluorescent in the sample inside the chamber. Furthermore, the device comprises identification means arranged to identify the number of organisms that are both moving by themselves and fluorescent.

Forming a device so that it can detect motile organisms, fluorescent organisms, and organisms that are both motile and fluorescent is advantageous in that it hereby is possible to relatively accurately quantify the number of live organisms in the sample in a simple and cost-effective manner.

In this context, the term "guiding means" should be understood as any kind of conduit, tube, channel or other e.g. in association with one or more pumps and/or valves that are capable of guiding a liquid sample into a chamber.

Also, in this context, the term "analysing means" should be understood as any kind of image recognition system, vision system, visual sensor system, motion tracking system e.g. including a PC or any other kind of analyser suitable for analysing pictures of a liquid sample to count the number of organisms moving by themselves in a liquid sample.

Furthermore, in this context, the term "detection means" should be understood as any kind of image recognition system, vision system, visual sensor system or any other kind of detector suitable for counting the number of organisms that are fluorescent in a liquid sample inside a chamber.

Even further, in this context, the term "identification means" should be understood as any kind of personal computer, logical circuit, electronical calculation system e.g. including some sort of data storing facility or any other kind of identificator suitable for identifying the number of organisms that are both moving by themselves and fluorescent in a liquid sample.

In an aspect of the invention, the device further includes a light filter comprising means to block or attenuate light in at least the part of the violet-blue spectrum.

By blocking or attenuating light in at least the part of the violet-blue spectrum it is possible to more accurately detect the fluorescent organisms.

In an aspect of the invention, the light filter is arranged between the camera and the chamber.

Hereby is achieved an advantageous embodiment of the invention.

In an aspect of the invention, the guiding means comprises a pump.

Forming the guiding means with at least one pump is advantageous in that it hereby is possible to quickly and efficiently lead the sample to the chamber.

In an aspect of the invention, the device comprises control means arranged to control the violet-blue light source in response to the detection means.

It is advantageous to control the violet-blue light source in response to the detection means in that the violet-blue light source hereby can be controlled to only light up when the detection means are active thus, reducing the risk of damaging the organisms by the violet-blue light.

In an aspect of the invention, the device comprises a secondary light source.

Providing the device with a secondary light source is advantageous in that it hereby is possible to illuminate the sample with light having other properties e.g. more suited for motion tracking.

In an aspect of the invention, the device comprises control means arranged to control the secondary light source, the violet-blue light source and/or the detection means in response to the analysing means.

Providing control means arranged to control the light sources and/or the detection means in response to the analysing means is advantageous in that it enables a faster and efficient counting of organisms moving by themselves in the sample.

In an aspect of the invention, the identification means comprises means for simultaneous detection of organisms that are both moving by themselves and fluorescent.

Providing identification means for simultaneous detection of organisms that are both moving by themselves and fluorescent is advantageous in that it enables a fast and efficient detection.

In an aspect of the invention, the device further comprises quantification means arranged to add the detected number of organisms that are moving by themselves to the detected number of organisms that are fluorescent and subtract the number identified by the identification means.

Deducting the organisms identified by the identification means from the sum of organisms detected by the analysing means and the detection means is advantageous in that repeaters hereby can be avoided and a more accurate number of living organisms can be achieved.

In this context, the term "quantification means" should be understood as any kind of personal computer, logical circuit, electronical calculation system e.g. including some sort of data storing facility or any other kind of quantificator suitable for adding a detected number of organisms that are moving by themselves to a detected number of organisms that are fluorescent and subtracting the number of organisms identified by the identification means.

In an aspect of the invention, the chamber is shaped in accordance with the field of view of the camera and/or the optics.

Forming the chamber so that at least some of the sides of the chamber corresponds with the spread of the field of view of the camera and/or the optics is advantageous in that this will enable that substantially the entire sample inside the chamber can be seen by the camera, so that the entire sample can be tested at once.

In an aspect of the invention, the living organisms are quantified by means of a method according to any of the previously discussed methods.

Even further, the invention provides for use of a device according to any of the previously described devices for quantifying living organisms in a liquid sample of ballast water of a ship.

Ballast water typically contains many different types and sizes of organisms and it is therefore particularly advantageous to quantifying living organisms in ballast water by means of a device according to the present invention.

FIGURES

Figure 2:
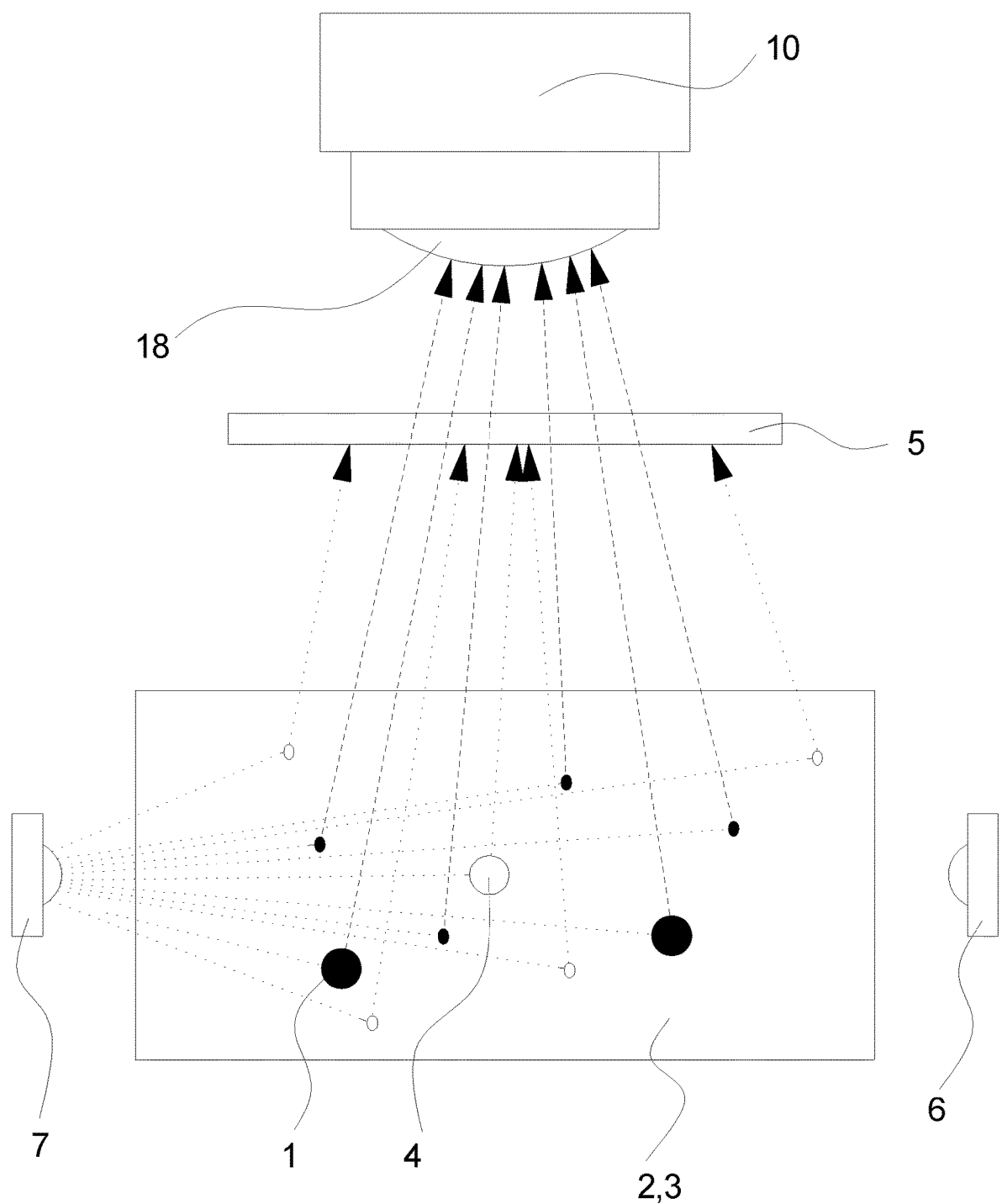
Figure 3:
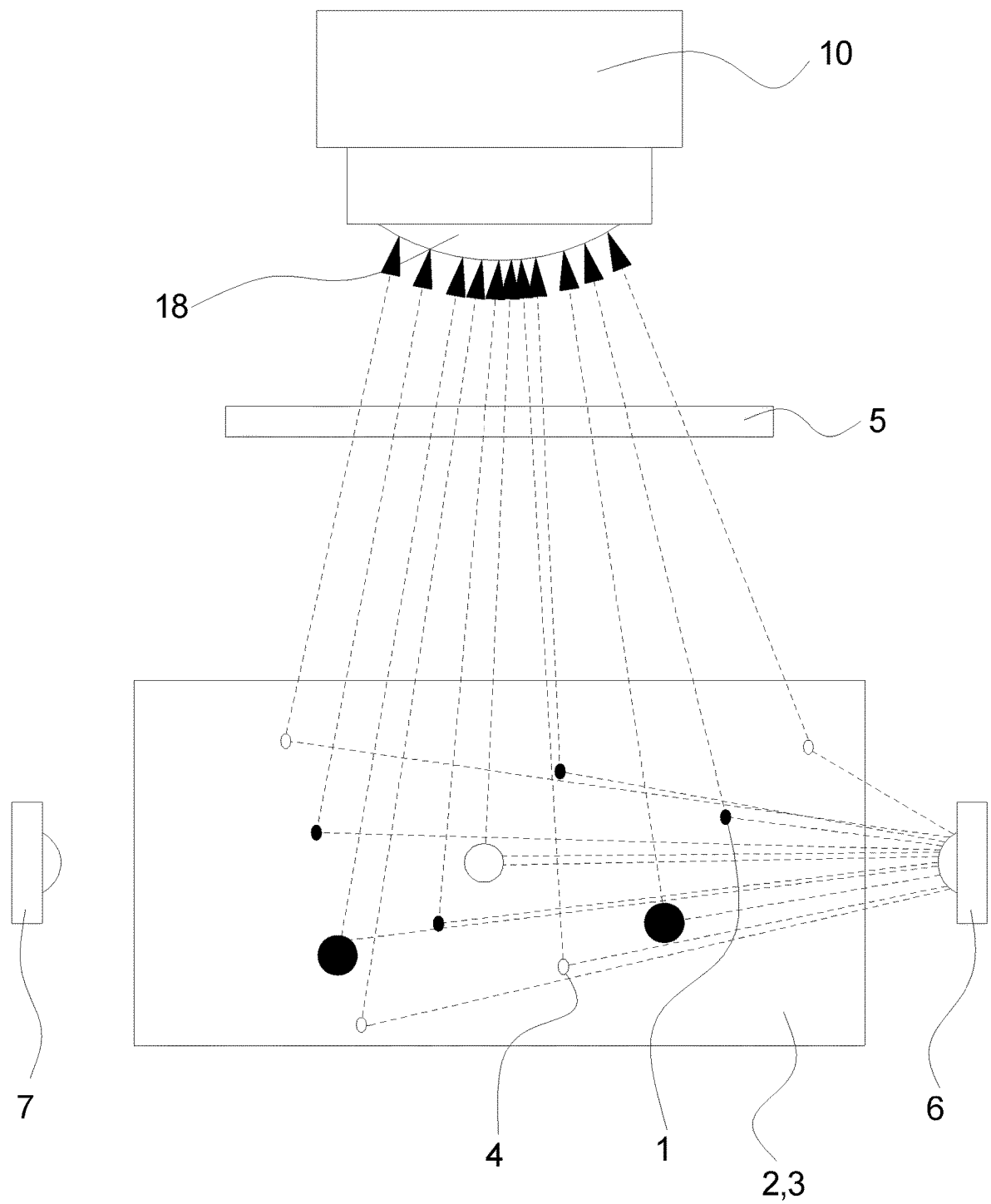
Figure 4:
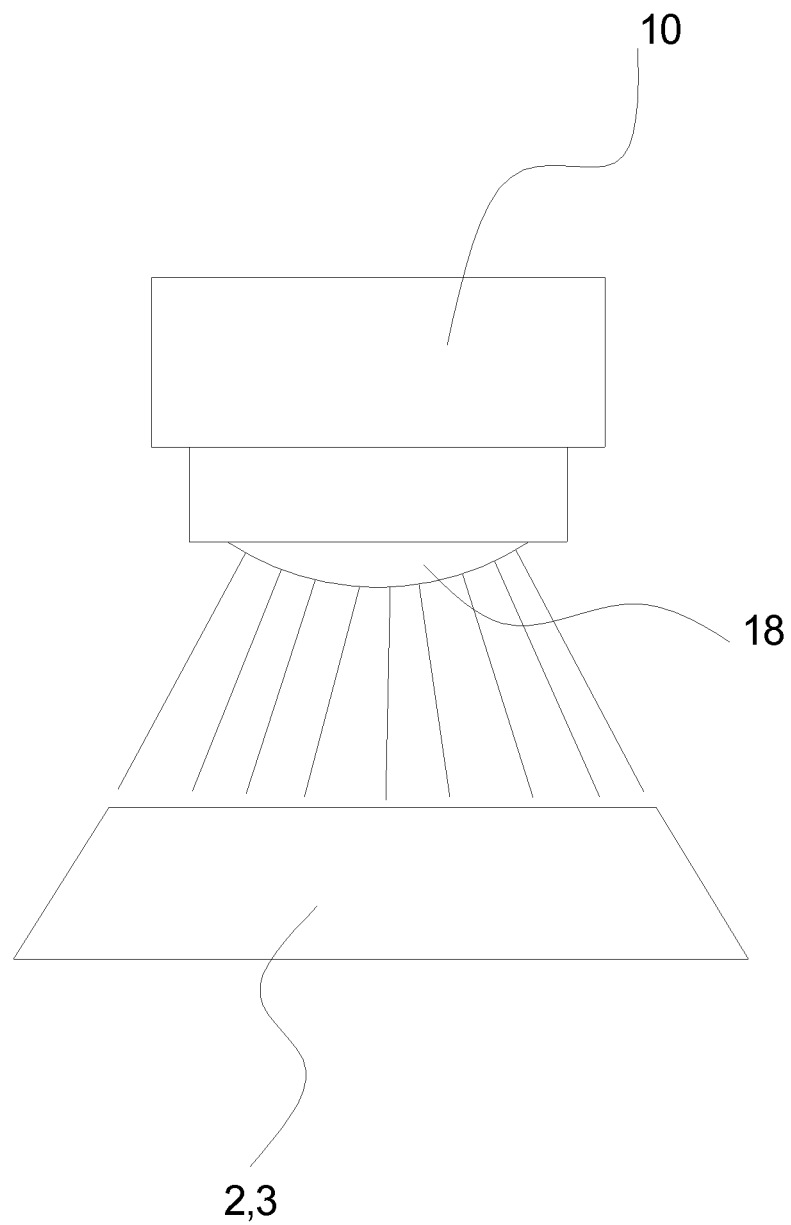

The invention will be described in the following with reference to the figures in which FIG. 1. illustrates a simplified embodiment of a device for quantifying living organisms in a liquid sample, as seen from the top, FIG. 2 illustrates a device detecting fluorescent organisms, as seen from the side, FIG. 3 illustrates a device detecting motile organisms, as seen from the side, and FIG. 4 illustrates a special embodiment of a chamber, as seen from the side.

DETAILED DESCRIPTION

FIG. 1 illustrates a simplified embodiment of a device 15 for quantifying living organisms 1, 4 in a liquid sample 2, as seen from the top.

In this embodiment, the device comprises a liquid container 17 into which a specific amount of liquid to be test is filled. However, in another embodiment the liquid could be drawn directly from the source (i.e. the water tank, the lake, the ocean or other to be controlled).

From the liquid container 17 the liquid is led to a chamber 3 by means of guiding means 9, which in this embodiment includes pipes and a pump ensuring fast and efficient filling of the chamber 3. The size of the chamber 3 in relation to the liquid container 17 is not correct in the present illustration. In a preferred embodiment the volume of the liquid container 17 is many times bigger than the volume of the chamber 3.

In the chamber 3 the liquid sample 2 is in this embodiment first illuminated by a secondary light source 6 producing white light while a camera 10 is recording a number of consecutive pictures that are analyzed "on-the-fly" by analysing means 11 to detect and count the number of motile organisms 4 in the sample. However, in another embodiment the secondary light source 6 could be of another type or the secondary light source 6 could be omitted and the motion tracking could be performed in natural lighting i.e. sunlight.

Once this motion detection has ended, the secondary light source 6 is turned off and a violet-blue light source 7 arranged to emit light in the violet-blue spectrum is turned on while the camera 10 is recording at least one picture that is analyzed "on-the-fly" by detection means 12 detecting and counting the number of organisms 1 that are fluorescent in the sample 2. However, in another embodiment the detection of motile organisms 4 and the detection of fluorescent organisms 1 could take place in reverse order.

In this embodiment the device 15 also comprises identification means 13 arranged to identify the number of organisms 1, 4 that are both motile and fluorescent by performing motion tracking on the fluorescent organisms 1 while the the secondary light source 6 is turned off and a violet-blue light source 7 is turned on i.e. in this embodiment substantially simultaneously with the detection of fluorescent organisms 1 is taking place. However, in another embodiment the process for detecting and counting organisms 1, 4 that are both motile and fluorescent could run as a separate and consecutive process in relation to the process of detecting and counting the number of organisms 1 that are fluorescent in the sample 2 in any order.

In this embodiment the violet-blue light source 7 is an LED capable of emitting intense light with a wavelength of 380-450 nanometers. However, in another embodiment the wavelength range of the violet-blue light source 7 could be narrower or at least a bit broader and/or the light source could be of another type such as an incandescent bulb, neon tube or other and/or the device 15 could comprise more than one violet-blue light source 7.

Likewise, in this embodiment the secondary light source 6 is an LED capable of emitting intense white light with a wavelength over substantially the entire visible spectrum of between 380 and 760 nanometers. However, in another embodiment the wavelength range of the secondary light source 6 could be narrower or it could include at least some of the infrared range, the ultraviolet range and/or other, and/or the light source 6 could be of another type such as an incandescent bulb, neon tube or other and/or the device 15 could comprise more than one secondary light source 6.

In this embodiment, the device 15 also comprises quantification means 14 arranged to quantify the living organisms 1, 4 in the liquid sample by adding the detected number of organisms 4 that are moving by themselves to the detected number of organisms 1 that are fluorescent and then subtract the number identified by the identification means 13.

In this embodiment, the guiding means 9 also comprises pipes and a pump arranged for leading the liquid sample 2 out of the chamber 3 when living organisms 1, 4 have been quantified.

In this embodiment, the device 15 also comprises control means 16 arranged to control the violet-blue light source 7, the secondary light source 6 and the pumps of the guiding means 9 in response to the camera 10 and the analysing means 11, detection means 12, identification means 13, quantification means 14. I.e. in this embodiment substantially the entire quantification process is controlled by the control means 16 but in another embodiment, some of the processes would be autonomous and/or they would control each other and/or the control would be divided onto several control means 16 and or at least some of the processes would be manually controlled.

In this embodiment the analysing means 11, detection means 12, identification means 13, quantification means 14, and the control means 16 are all enabled by means of a computer i.e. in the form of one or more software programs running on a computer being connected to the camera 10, the guiding means 9 and the light sources 6, 7. However, in another embodiment at least some of the processes performed by the analysing means 11, detection means 12, identification means 13, quantification means 14, and the control means 16 could be enabled through other electronic devices e.g. the analysing means 11, detection means 12 and/or identification means 13 could be enabled by a processor integrated in the camera 10 to enable a faster and more efficient analysis and/or the operation of the guiding means 9 and the light sources 6, 7 could be controlled by a separate switchbox as indicated in FIG. 1.

Also in another embodiment, at least some of the pictures would not be analyzed on-the-fly but would instead be stored and subsequently analyzed e.g. if analysing means 11, detection means 12, identification means 13, quantification means 14 was arranged distant in relation to the camera 10.

The present method involves viewing organisms 1, 4 in an optical chamber 3 using suitably dimensioned optics 18. The fraction of 10-50 μm organisms 1, 4 will in this embodiment require a magnification of 2× with a high-resolution camera 10 of 1600×1200 pixels. A typical camera 10 has a pixel size of 4.4 μm, which means that each pixel is approximately 2.2 μm across and the field of view is 3.5 mm×2.6 mm. The depth of field can be set to 0.7 mm by the choice of aperture and this gives a chamber volume of 6 μl. The detection limit is a single cell 1, 4 and the statistical outcome depends on the number of analysis of the chamber volume. The dimensions for an optical chamber 3 for viewing the organism fraction >50 μm are approximately 70 mm×50 mm×20 mm (L×W×H) giving a chamber volume of 70 ml. Using the same camera resolution as above, the pixel size is 40 μm, and the detection limit is also a single cell 1, 4. In order to detect concentrations as low as 10 per m^3, a filtration through a 50 μm mask (not shown) towards achieving a 1000× concentration could be advantageous, but the present method still enables testing of unfiltered samples 2. For both size fractions, a number of chamber volumes could be analyzed from the same sample 3 to give a statistically more accurate result. I.e. in an embodiment of the invention the quantification of the smaller organisms 1, 4 would be performed in a smaller chamber 3 and the larger organisms 1, 4 would be performed in a larger chamber 3.

Most heterotrophic cells 1, 4, and virtually all flagellates and ciliates, are motile. This observation applies to both size fractions. The content of the chamber 3 is in this embodiment analyzed on a time base of 10 to 25 frames per second in real time by a computer 11, 12, 13, 14 to which the camera 10 is connected. Each frame is analyzed and individual cells 1, 4 are detected and measured. The movement of each cell is tracked over time from frame to frame by the computer 11, 12, 13, 14. In this way, it can be established whether each cell 1, 4 is within the size range and whether it is motile or not. In this embodiment, the sequences are also saved on the computer hard drive as video files for subsequent documentation.

Some autotrophic cells 1, 4 contain chlorophyll and are non-motile while some contain chlorophyll and are also motile. The presence of chlorophyll alone is an indication of a live autotrophic cell, because chlorophyll disappears quite rapidly after cell damage. Chlorophyll within the cells 1, 4 is in this embodiment detected by viewing fluorescence after stimulating the organisms 1 with violet light at a wavelength of approximately 420ηm. The insertion of a light filter 5 in the form of a high pass filter of approximately >500ηm between the chamber 3 and the camera 10 means that substantially only fluorescence is observed by the camera 10. Chlorophyll is evenly distributed throughout a cell 1 so that the cell size can be determined by the overall size of the chlorophyll organelles, which merge into each other to form a single fluorescent object. There are relatively few autotrophic species that are >50 μm so this method is mostly relevant for the 10-50 μm fraction. This method allows detection and sizing of cells that are still against a dark background as well as detection of motile fluorescent cells 1 by also performing motion tracking on the fluorescent organisms 1.

According to different regulations in different countries as certain amounts of liquid (i.e. several samples) need to be analyzed to provide a higher degree of statistical certainty in relation to total amount of liquid. In order to achieve this, the guiding means 9 are in this embodiment provided with pumps located between the liquid container 17 (e.g. containing the total amount of liquid to be tested) and the chamber 3 to fill the chamber 3 fast and efficiently and again at an outlet 19 to drain the tested sample fast and efficiently from the chamber 3.

Synchronization between sample flow and analysis is in this embodiment performed by control means 16 enabled by a computer.

The system 15 can detect single cells 1, 4 but the accuracy of a measurement depends on:
- the volume of the chamber 3
- the number of chambers 3 that are analyzed for a given liquid amount
- the concentration of organisms 1, 4 that shall be detected The analysis for the 10-50 μm fraction will in this embodiment resemble a Poisson process where a small volume is taken at random out of a larger volume and the expected number of organisms 1, 4 is at most one per chamber. A practical number of chamber analysis for each small volume for the 10-50 μm fraction is in the region of 50 in which case the measurement specification would be 10±10 (±100%) with 95% confidence, assuming a chamber volume of 6 μl. This accuracy improves with a larger chamber size (and with higher resolution camera 10 and optics 18) and/or a higher number of analysis per small volume. As an example, increasing the chamber volume 5× and the number of analysis 2x gives a measurement specification of 10±32% with 95% confidence. All statistical estimates are based on simulations where the probability of detection in a single volume measurement is C.V, where C is the organism concentration and V is the volume. Simulations are subsequently based on randomly generated detection events on a given number of volumes. Each simulation is then repeated 1000 times or more to render the distribution from which the 95% confidence interval can be found.

One liter or more of liquid can be analyzed for the >50 μm fraction. The chamber 3 is completely emptied between each fill and subsequent analysis, so the entire volume of the one liter liquid is actually analyzed. This gives a different statistical outcome compared to that of the smaller fraction and the accuracy depends more on how the sample is collected and filtered. It would be desirable to concentrate a 1 m3 liquid volume 1000× by filtering it through a 50 μm filter. The filtration would also increase accuracy by the optical system because the resolution in this embodiment is such that cells 1, 4 smaller than 50 μm, which would otherwise be present, are detectable but not accurately measured.

FIG. 2 illustrates a device 15 detecting fluorescent organisms 1, as seen from the side.

In this embodiment the sample 2 inside the chamber 3 is illuminated with the violet-blue light source 7 enabling that the fluorescent organisms 1 will glow and emit light at a wavelength typically between 600-800 nm.

In this embodiment, the device 15 is therefore also provided with a light filter 5 designed to substantially block light of a wavelength below 500 nm and the camera 10 will therefore substantially only see the glowing fluorescent organisms 1 in the sample 2 making it easy to quantify these organisms 1 since substantially all noise has been sorted out.

If only fluorescent organisms 1 is detected, a single picture by the camera is in principle sufficient, in that the number of living fluorescent organisms 1 can be detected by simply counting the number of glowing dots on the picture. However, in this embodiment the number of organisms 1, 4 that are both motile and fluorescent also has to be detected, so the camera 10 will in this embodiment continue recording so that the fluorescent organisms 1, 4 that are moving by their own motion can also be identified.

FIG. 3 illustrates a device 15 detecting motile organisms 4, as seen from the side.

In this embodiment, the violet-blue light source 7 has been turned off and the sample 2 inside the chamber 3 is now illuminated with the secondary light source 6 enabling that substantially all the organisms 1, 4 in the sample (at least all the organisms 4 over a specific size) can be seen by the camera 10 so that an analysis of subsequent images will enable that the number of living motile organisms 4 can be identified.

FIG. 4 illustrates a special embodiment of a chamber 3, as seen from the side.

E.g. in relation to quantification of living organisms 1, 4 in ballast water it is—according to some regulations in some countries—required that a percentage volume or a fixed volume (e.g. 1 cubic meter) e.g. is drawn and then all of this percentage volume or fixed volume will have to be tested to establish/estimate the number of living organisms 1, 4 in the entire volume. This can be a problem in that some of the motile organisms 4 to be detected will have a tendency to seek out to the edges of the chamber 3 where the camera 10 might not detect them.

Thus, according to an embodiment of the invention the chamber 3 is shaped in accordance with the spread of the field of view of the camera 10 and optics 18. I.e. in this embodiment the sides of the chamber 3 are formed slanting to correspond very precisely with the field of view of the present camera 10 and optics 18 design.

The invention has been exemplified above with reference to specific examples of chambers 3, light sources 6, 7, devices for quantifying living organisms 15 and other.

However, it should be understood that the invention is not limited to the particular examples described above but may be designed and altered in a multitude of varieties within the scope of the invention as specified in the claims.

LIST

1. Fluorescent organism
2. Liquid sample
3. Chamber
4. Motile organism
5. Light filter
6. Secondary light source
7. Violet-blue light source
8. Storage device
9. Guiding means
10. Camera
11. Analysing means
12. Detection means
13. Identification means
14. Quantification means
15. Device for quantifying living organisms
16. Control means
17. Liquid container
18. Optics
19. Outlet

The invention claimed is:

1. A method for quantifying living organisms in a liquid sample, said method comprising the steps of
   guiding said liquid sample into a chamber,
   analysing pictures of said sample inside said chamber to detect the number of organisms moving by themselves in said sample,
   illuminating said sample with light in at least a part of the violet-blue spectrum while detecting the number of organisms that are fluorescent in said sample inside said chamber, and
   analysing pictures of said sample inside said chamber while illuminating said sample with light in at least a part of the violet-blue spectrum to detect the number of organisms that are both moving by themselves and fluorescent.

2. The method according to claim 1, wherein said number of fluorescent organisms are detected by analysing one or more pictures of said sample inside said chamber.

3. The method according to claim 2, wherein said one or more pictures are recorded through a light filter arranged to block or attenuate light in at least said part of the violet-blue spectrum.

4. The method according to claim 3, wherein said light filter is arranged to block or attenuate light at a wavelength below 650 nm.

5. The method according to claim 1, wherein said pictures used for detecting the number of organisms moving by themselves are recorded while illuminating said sample.

6. The method according to claim 5, wherein said secondary light source is turned off while said pictures used for detecting the number of organisms moving by themselves are recorded.

7. The method according to claim 1, wherein said pictures used for detecting the number of organisms moving by themselves are recorded while illuminating said sample with a secondary light source different from a violet-blue light source generating light in said at least a part of the violet-blue spectrum.

8. The method according to claim 1, wherein said method further comprises the step of analysing said pictures used for detecting the number of organisms moving by themselves to detect the size of said organisms moving by themselves.

9. The method according to claim 1, wherein said method further comprises the step of guiding said liquid sample out of said chamber when said number of organisms moving by themselves has been detected and when said number of organisms that are fluorescent has been detected.

10. The method according to claim 1, wherein said method further comprises the step of allowing said liquid sample to settle inside said chamber before said number of organisms moving by themselves is detected.

11. The method according to claim 1, wherein said organisms that are both moving by themselves and fluorescent are identified by detecting the number of organisms that are moving by themselves in said sample while detecting the number of organisms that are fluorescent.

12. The method according to claim 1, wherein said living organisms in said liquid sample are quantified by adding said detected number of organisms that are moving by themselves to said detected number of organisms that are fluorescent to get an intermediate result, and then subtracting said detected number of organisms that are both moving by themselves and fluorescent from said intermediate result.

13. The method according to claim 1, wherein said method step of analysing pictures of said sample inside said chamber to detect the number of organisms moving by themselves in said sample and said method step of illuminating said sample with light in at least a part of the violet-blue spectrum while detecting the number of organisms that are fluorescent in said sample inside said chamber are performed as two separate consecutive actions.

14. A device for quantifying living organisms in a liquid sample, said device comprising
- a chamber for holding said sample,
- guide for guiding said sample into said chamber,
- a camera arranged to record pictures of said sample inside said chamber,
- analyser arranged to analyse said pictures to count the number of organisms moving by themselves in said sample,
- a violet-blue light source arranged to illuminate said sample with light in at least a part of the violet-blue spectrum,
- detector arranged to count the number of organisms that are fluorescent in said sample inside said chamber,
- identificator arranged to identify the number of organisms that are both moving by themselves and fluorescent.

15. The device according to claim 14, wherein said device further includes a light filter comprising means to block or attenuate light in at least said part of the violet-blue spectrum.

16. The device according to claim 15, wherein said light filter is arranged between said camera and said chamber.

17. The device according to claim 14, wherein said device comprises controller arranged to control said violet-blue light source in response to said detector.

18. The device according to claim 14, wherein said device comprises controller arranged to control said secondary light source, said violet-blue light source and/or said detector in response to said analyser.

19. The device according to claim 14, wherein said identificator comprises means for simultaneous detection of organisms that are both moving by themselves and fluorescent.

20. The device according to claim 14, wherein said device further comprises quantificator arranged to add said detected number of organisms that are moving by themselves to said detected number of organisms that are fluorescent and subtract said number identified by said identificator.

* * * * *